United States Patent

[11] 3,585,844

| | | |
|---|---|---|
| [72] | Inventor | Josephus D. Dornseiffen<br>Zevenaar, Netherlands |
| [21] | Appl. No. | 854,922 |
| [22] | Filed | Sept. 3, 1969 |
| [45] | Patented | June 22, 1971 |
| [73] | Assignee | Turmac Tobacco Company N. V.<br>Zevenaar, Netherlands |

[54] MEASURING DEVICE
2 Claims, 5 Drawing Figs.

[52] U.S. Cl. ............................................. 73/37.7
[51] Int. Cl. .......................................... G01b 13/08
[50] Field of Search ........................................ 73/37.5–.7

[56] References Cited
UNITED STATES PATENTS

| 2,880,609 | 4/1959 | Byrkett et al. | 73/35.5UX |
| 2,884,495 | 4/1959 | Frankel | 73/37.5UX |
| 3,438,244 | 4/1969 | Plumpe, Jr. | 73/37.5X |

*Primary Examiner*—Louis R. Prince
*Assistant Examiner*—William A. Henry, II
*Attorney*—Kurt Kelman ABSTRACT: A measuring device for measuring the average radial dimension of a string-shaped object is provided with a cylindrical chamber having a passage in its cylindrical wall and a central opening in each of its end walls. The object to be measured is passed through the chamber with gas at a constant pressure being applied to the chamber simultaneously. The chamber also contains a cylindrical body arranged therein which leaves a space between it, the cylindrical wall and a central space as a passage for the object concentrically with the axis of the chamber. The central body serves as a preresistance and together with the pressure flow characteristics of the chamber, assumed to be given, provides a linear relation between the average radial dimension $d$ and the basic pressure $P_2$.

PATENTED JUN22 1971 3,585,844

INVENTOR.
JOSEF D. DORNSEIFFEN
BY
AGENT

MEASURING DEVICE

This invention relates to a measuring device for measuring the average radial dimension of a bar- or string-shaped object, like e.g. a filter strand or rod, cigarette strand or rod, or similar cylindrical semi- or end product in the tobacco industry. Said device is usually provided with a so-called diameter feeler or sensing member, comprising a cylindrical chamber having a passage in its cylindrical wall and a central opening in each of its end walls, through which openings the object, extending from the chamber, can be passed and on which passage a source can be connected for supplying a gas at a constant pressure into the said chamber.

The gas, mostly consisting of air, supplied through the passage into the chamber, will escape between the object moving axially or not and the edge of the central opening in both end walls, and will thereby meet a resistance, which is dependent on the average radial dimension $d$ of the object, on the understanding that the resistance will be greater according as the passage left free by the object within the opening is smaller. By incorporating the diameter feeler into a pneumatic network the resistance of said feeler is usually converted into a measurable basic quantity, mostly pressure or sometimes flow. By means of a simple network, e.g. in the form of a series connection, the resistance $R_2$ of the diameter feeler, constituting a function of the average radial dimension $d$ of the object, can be determined as difference between a constant preliminary pressure $P_1$, derived from an air pressure installation and the pressure, measured between the resistance $R_2$ and a constant preresistance $R_1$.

The relation between the basic pressure $P_2$ and the average radial dimension $d$ of the object cannot be determined by a simple calculation, since the resistance of the feeler $R_2$ and preresistance $R_1$ represented by the pressure/flow characteristics are not linear. This difficulty can be met by making use of the graphic method in said network.

If thereto on the Y-axis the common flow $\Phi$ through the resistance $R_1$ and $R_2$ and on the X-axis the preliminary pressure $P_1$ and the measured basic pressure $P_2$ are plotted, the latter is determined by the distance between the projection on the Y-axis of the point of intersection, between both graphics and the Y-axis at the right, belonging thereto. In case the graphic method is applied for a plurality of values of the average radial dimension $d$, then the projections on the X-axis of the intersections between the pressure/flow characteristics of the diameter feeler and of the preresistance both determine the relation between the dimension D of the diameter feeler and the basic pressure $P_2$. The said relation is not obviously linear.

This does not only depend from the shape of the pressure/flow characteristics of feeler and preresistance, but also from the distances between said characteristics of the feeler with an arithmetical progression for $d$. The linear relation is desired if the measuring device is used for direct indication by means of a scale which is gauged in units of the average radial dimension $d$. The linear relation is necessary when the measuring device is used for registration, e.g. via an air-pressure/electric voltage transmittor, of the dimension $d$ and for interpretation thereof later on. The linear relation is also necessary when the measuring device is used in an apparatus by means of which a histogram of the average radial dimension is represented automatically and continuously. For, a nonlinear relation provides with said apparatus a nonlinear histogram which is difficult to interpret, or causes a complicated and therefore expensive gauging device of the indicating scale. Exchange of the diameter feeler, e.g. if it has seriously been damaged, makes a complicated regauging of the scale necessary, which derogates from the economical utility of the feeler.

The objections appearing with a nonlinear relation will fall away if, owing to the application of the measures according to the invention, a linear relation between the average radial dimension $d$ and the basic pressure $P_2$ is achieved. Herewith it should be considered that the possibilities to alter the pressure/flow characteristics of the feeler in a favourable sense are limited, in consequence of the properties of the measuring object and the available building space, of which the axial dimension should be kept small in view of the mutual distance of the central openings for passing the object.

The invention aims at the construction of a preresistance in a measuring device as described above which, together with the pressure/flow characteristics of the feeler to be assumed as given, provides a linear relation. Thereto, at the measuring device according to the present invention, a cylindrical body serving as a preresistance, has been arranged within the chamber, leaving a free space between it and the cylindrical wall as well as a central space for the passage of the object, concentrically with the axis of the said chamber, said cylindrical body being provided with radially directed, narrow passages, of which at least the edges of the openings directed to the cylindrical chamber wall are arranged at right angles with respect to the direction of passage.

For, it has appeared in practice that the pressure/flow characteristic of the preresistance should be linear, beginning initially at zero value of the pressure and flow, then to deflect to a limit value of the flow, at greater values of the pressure. The resistance $R_1$ of the preresistance, which is determined by the cot of the angle between the tangent at the graphic and the X-axis, should therefore be constant at first, to increase at greater values of the pressure. In order to realize these characteristics, according to the invention use has been made of the difference in behavior between a laminary and a turbulent flow in a narrow passage.

At an embodiment of a measuring device according to the present invention the preresistance comprises disc rings, mutually spaced by distance pieces having a slight radial dimension, which impedes as little as possible the gas flow between the rings. For instance by arranging thin pins in holes drilled axially aligned in the disc rings and distance pieces, the resistance can be mounted in a simple way concentrically with the chamber axis, and if desired, removably.

At a further embodiment of the measuring device according to the present invention the axial dimension of the distance pieces may advantageously have different values. The pressure/flow characteristic of the preresistance may than easily be influenced by varying the width of the passages. An embodiment of the present invention, represented schematically, will now be explained with the aid of the accompanying drawing, wherein.

Figure 1:
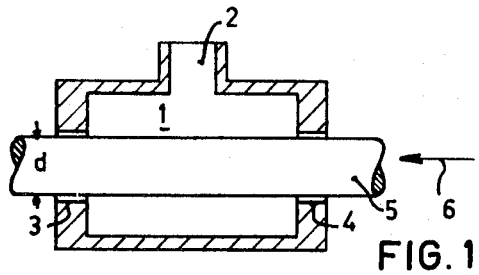
FIG. 1 is an axial section of a usual diameter feeler.

A usual diameter feeler has been represented in FIG. 1, comprising a cylindrical chamber 1, provided with a passage 2 in the cylindrical wall and central openings 3, 4 in the end walls. A conduit (not represented) derived from an air source of a constant pressure, has been connected with the passage 2, whereas with a string-shaped measuring object, e.g. a filter strand 5, the air can escape from the chamber 1 via an annular slit left free between the object 5 and the edge of the openings 3, 4 in both end walls.

Figure 2:
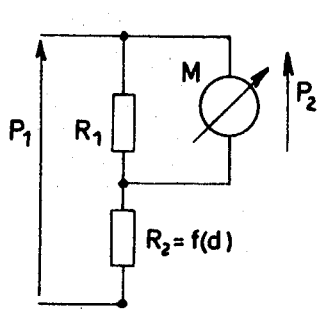
FIG. 2 represents the pneumatic network of the feeler according to FIG. 1.

The pneumatic network for the feeler of FIG. 1 has been shown in FIG. 2, in which successively the pressure $P_2$, representing the output magnitude, measured by means of a pressure meter M over a constant auxiliary resistance $R_1$, the average radial dimension $d$ of the measuring object, representing the input magnitude and $P_1$, representing the constant auxiliary pressure, derived from the air pressure installation, have been indicated. Further $R_2$ represents the resistance of the feeler, which resistance constitutes a function of $d$.

Figure 3:
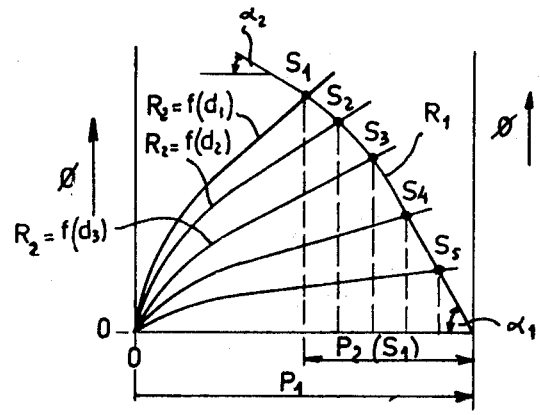
FIG. 3 shows some pressure/flow characteristics at several values of the average radial dimension $d$ of the resistance $R_2$ of the feeler as well as the characteristic of the preresistance $R_1$.

In FIG. 3 the auxiliary pressure $P_1$ and the output pressure $P_1$ have been plotted on the X-axis, whereas the common flow $\Phi$ through the resistances $R_1$ and $R_2$ have been plotted on the Y-axis. The pressure $P_2$ is determined by the distance between the projection on the X-axis of the intersection $S_1$ between the pressure/flow characteristic of the auxiliary resistance, indicated by $R_1$, and the pressure/flow characteristic of the feeler, for an average radial dimension $d_1$ of the object, indicated by $R_2$, and the Y-axis belonging thereto (vide at the right in the figure).

Figure 4:
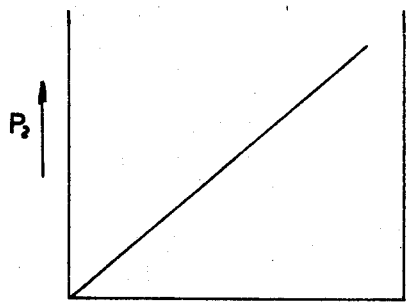
FIG. 4 shows the linear relation between the basic pressure of the device and the average radial dimension of the measuring object and FIG. 5 shows an axial section of an embodiment of the measuring device according to the invention.

Further, the pertaining pressure/flow characteristic $R_2$ has been represented in FIG. 3 for a plurality of other values of the average radial dimension of the object, viz $d_2$, $d_3$ etc. The projections on the X-axis of the intersections $S_2$ $S_3$ etc. of said graphic with the same of the auxiliary resistance $R_1$ determine together the relation between the average radial dimension $d$ of the diameter feeler and the output pressure $P_2$. This relation which, according to the present invention, has been made linear, has been represented in FIG. 4.

Figure 5:
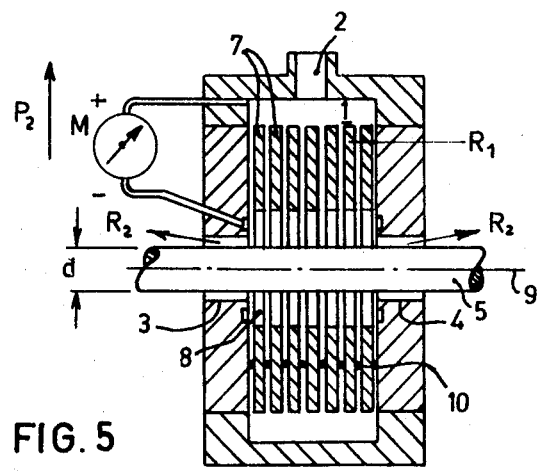

From FIG. 3 it appears further that the pressure/flow characteristic of the auxiliary resistance should initially be linear for $P=O$ and $\Phi=O$ and then deflects to the limit value of $\Phi$ at greater values of $P$, i.e. the resistance $R_1$ of the auxiliary resistance is determined by cot $\alpha = dp/D\Phi$, which is constant at first and increases at greater values of $P$. In order to realize this in practice use has been made of the known difference in behavior between a laminary and a turbulent flow in a narrow passage or slit. This principle has been applied in the construction according to the present invention of the auxiliary resistance, as shown in FIG. 5.

The measuring device comprises a diameter feeler of known construction, as according to FIG. 1, so that the corresponding parts have been indicated with the same reference numbers. A number of disc rings 7, provided with a concentric hole 8, have been mounted within the chamber 1 concentrically with the centerline 9, at mutually equal distance determined by the axial dimension of distance pieces 10, which have been arranged in three series parallel to the centerline and mutually displaced at an angle of 120°. The output pressure $P_2$ is measured with the pressure meter M between the auxiliary pressure and a point of the central space, lying between both resistances connected in series. Instead of the said meter a transmitter may be applied as well which transmits the pressure into an electric voltage.

An accidental advantage of the compact building of the measuring device is compared with the known measuring devices, the slight pneumatic time constant, which is caused in that when the average radial dimension $d$ is changed quickly not only the resistances $R_1$ and $R_2$ play a part, but also the pneumatic capacity of the chamber 1. With a practical embodiment it has appeared by means of a quickly reacting transmitter, provided with short connections, that radial dimension variations up to 50 Hz. can be followed well. With the present high strand speeds this is a very appreciated property.

What I claim is:

1. Measuring device for measuring the average radial dimension of a bar- or string-shaped object, like e.g. a filter strand or rod, cigarette strand or rod, or similar cylindrical semi- or end product in the tobacco industry, which device is provided with a cylindrical chamber having a passage in its cylindrical wall and a central opening in each of its end walls, through which openings the object, extending from the chamber, can be passed and on which passage a source can be connected for supplying a gas at a constant pressure into the said chamber, characterized in that, a cylindrical body has been arranged within said chamber while leaving a space between it and the cylindrical wall and a central space as a passage for the object concentrically with the axis of the chamber, said cylindrical body serving as a preresistance and being provided with radially directed narrow passages, of which at least the edges of the openings directed to the cylindrical chamber wall are arranged at right angles with respect to the direction of passage.

2. Measuring device according to claim 1, characterized in that the preresistance comprises disc rings, which are mutually spaced by means of distance pieces having a slight radial dimension which impedes as little as possible the gas flow between the rings.